US010059247B1

(12) United States Patent
Bley et al.

(10) Patent No.: US 10,059,247 B1
(45) Date of Patent: Aug. 28, 2018

(54) MOTORCYCLE FORK FOR A LIFTING DEVICE

(71) Applicants: Taylor R. Bley, Luxemburg, WI (US);
Colten D. Jensen, Green Bay, WI (US);
Adam W. Lindley, Green Bay, WI (US)

(72) Inventors: Taylor R. Bley, Luxemburg, WI (US);
Colten D. Jensen, Green Bay, WI (US);
Adam W. Lindley, Green Bay, WI (US)

(73) Assignee: S.A.S. OF LUXEMBURG, LLC, Luxemburg, WI (US)

( * ) Notice: Subject to any disclaimer, the term of this patent is extended or adjusted under 35 U.S.C. 154(b) by 0 days.

(21) Appl. No.: 15/609,622

(22) Filed: May 31, 2017

(51) Int. Cl.
| | | |
|---|---|---|
| *E02F 3/40* | (2006.01) | |
| *B60P 3/075* | (2006.01) | |
| *B60P 3/12* | (2006.01) | |
| *E02F 3/80* | (2006.01) | |
| *E02F 3/96* | (2006.01) | |
| *B66F 9/14* | (2006.01) | |
| *B62H 3/08* | (2006.01) | |

(52) U.S. Cl.
CPC ............... *B60P 3/075* (2013.01); *B60P 3/122* (2013.01); *B62H 3/08* (2013.01); *B66F 9/144* (2013.01); *E02F 3/80* (2013.01); *E02F 3/962* (2013.01)

(58) Field of Classification Search
CPC ... B66F 7/22; B66F 7/243; B66F 9/12; B62H 3/08; A01B 59/062; E02F 3/962; E02F 3/3631; E02F 3/3663; E02F 3/8152; B60P 3/122
See application file for complete search history.

(56) References Cited

U.S. PATENT DOCUMENTS

| | | | | |
|---|---|---|---|---|
| 3,912,098 A * | 10/1975 | Nicotra | ................... | B60R 9/065 224/521 |
| 3,963,129 A | 6/1976 | Clayton | | |
| 6,533,526 B2 * | 3/2003 | Lindgren | .................. | B66F 9/12 187/237 |
| 6,575,310 B2 | 6/2003 | Chamoun | | |
| 7,104,745 B2 * | 9/2006 | Ochoa | ....................... | E02F 3/80 37/444 |
| 8,745,903 B1 * | 6/2014 | Ritter | ....................... | E02F 3/96 37/303 |

\* cited by examiner

*Primary Examiner* — Gregory W Adams
(74) *Attorney, Agent, or Firm* — Donald J. Ersler

(57) ABSTRACT

A motorcycle fork for a lifting device includes an attachment member and a lift carriage. The attachment member includes a first hook plate, a second hook plate, a lower cross member and an upper cross member. The lower cross member is attached between the first and second hook plates. The upper cross member is attached between the first and second hook plates. The lift carriage includes a first side support, a floor plate and a second side support. The side support preferably includes a lift base portion and a tapered extension. A notch and slot are cut in the first and second lift base portions to receive the upper and lower cross beams. A first edge of the floor plate is attached to a bottom of the first side support and a second edge of the floor plate is attached to a bottom of the second side support.

18 Claims, 5 Drawing Sheets

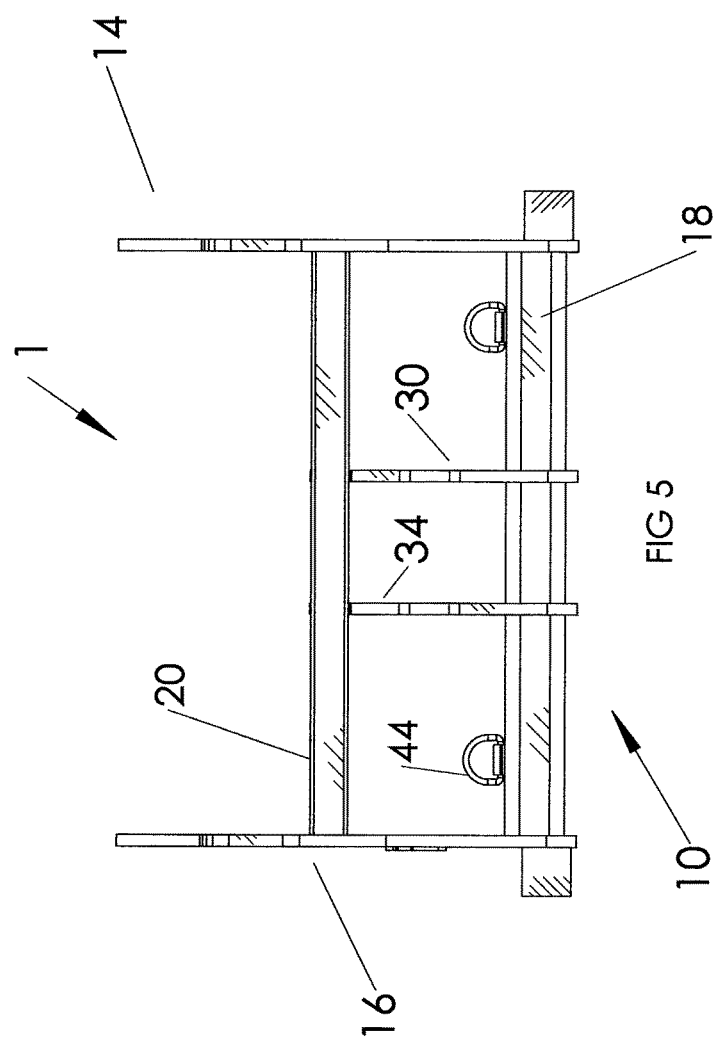

MOTORCYCLE FORK FOR A LIFTING DEVICE

BACKGROUND OF THE INVENTION

1. Field of the Invention

The present invention relates generally to salvage handling and more specifically to a motorcycle fork for a lifting device, which is specially designed to allow the transfer of a motorcycle from one place to another place without damaging the motorcycle.

2. Discussion of the Prior Art

It appears that the prior art does not teach or suggest a motorcycle fork for a lifting device. U.S. Pat. No. 3,963,129 to Clayton discloses a motorcycle carrier. U.S. Pat. No. 6,575,310 to Chamoun discloses a motorcycle lift.

Accordingly, there is a clearly felt need in the art for a motorcycle fork for a lifting device, which is specially designed to allow the transfer of a motorcycle from one place to another place without damaging the motorcycle.

SUMMARY OF THE INVENTION

The present invention provides a motorcycle fork for a lifting device, which is specially designed to allow the transfer of a motorcycle from one place to another place without damaging the motorcycle. The motorcycle fork for a lifting device (motorcycle fork) preferably includes an attachment member and a lift carriage. The lifting device is preferably a wheel loader, but other lifting devices could also be used. The attachment member preferably includes a first hook plate, a second hook plate, a lower cross member and an upper cross member. Each hook plate preferably includes a base portion, a lower extension and a hook portion. The hook portion extends upward from the base portion and the lower extension extends from a side of the base portion. A first end of the lower cross member is attached to the lower extension of the first hook plate and a second end of the lower cross member is attached to the lower extension of the second hook plate. A first end of the upper cross member is attached to a lower area of the first hook portion and a second end of the upper cross member is attached to a lower area of the second hook portion.

The lift carriage preferably includes a first side support, a floor plate and a second side support. The side support preferably includes a lift base portion and a tapered extension. An upper beam notch is cut in a top of the lift base portion and a lower beam slot is cut in a bottom of the lift base portion. The upper beam notch is preferably shaped to receive two sides of the upper cross member. The lower beam slot is preferably shaped to receive three sides of the lower cross member. The tapered extension extends from a side of the lift base portion. A height of the tapered extension is greatest adjacent the lift base portion and the least at an opposing end thereof. A first edge of the floor plate is attached to a bottom of the first side support and a second edge of the floor plate is attached to a bottom of the second side support. It is preferably to attach strap loops to the lower cross member and to the first and second side supports.

Accordingly, it is an object of the present invention to provide a motorcycle fork for a lifting device, which is specially designed to allow the transfer of a motorcycle from one place to another place without damaging the motorcycle.

These and additional objects, advantages, features and benefits of the present invention will become apparent from the following specification.

BRIEF DESCRIPTION OF THE DRAWINGS

FIG. 5 is a rear view of a motorcycle fork in accordance with the present invention.

DETAILED DESCRIPTION OF THE PREFERRED EMBODIMENTS

Figure 1:
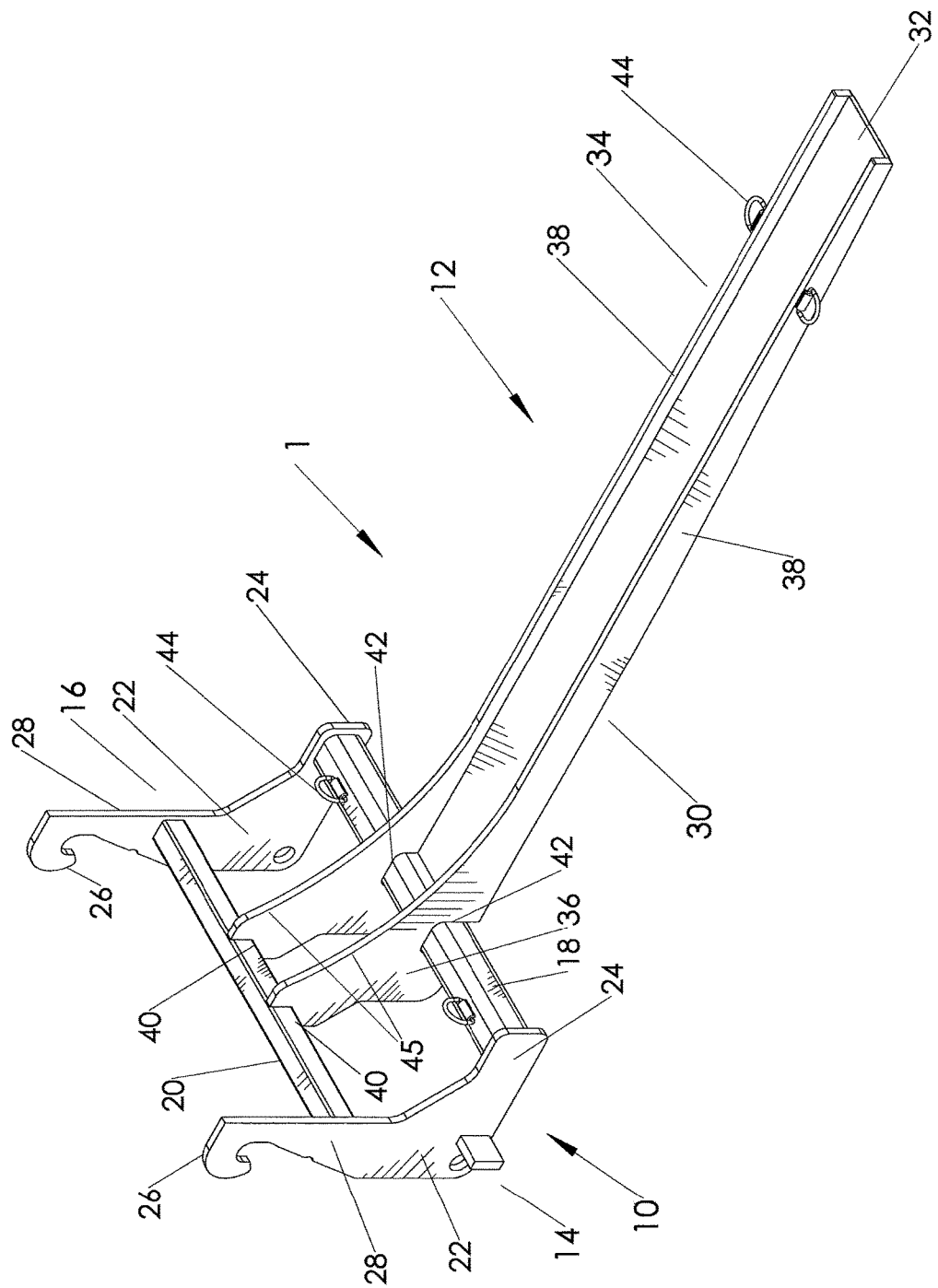
FIG. 1 is a front perspective view of a motorcycle fork in accordance with the present invention.
Figure 2:
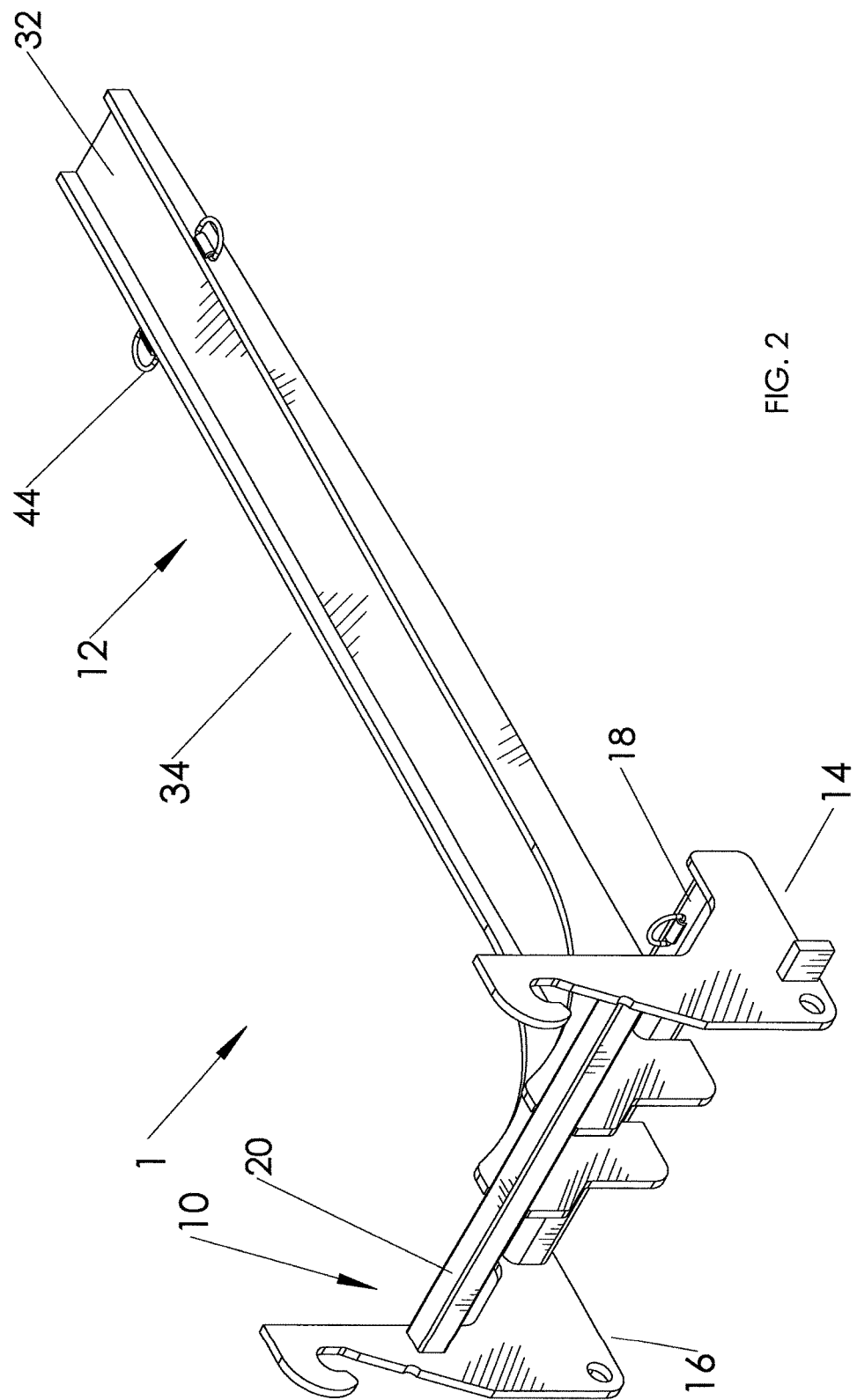
FIG. 2 is a rear perspective view of a motorcycle fork in accordance with the present invention.
Figure 3:
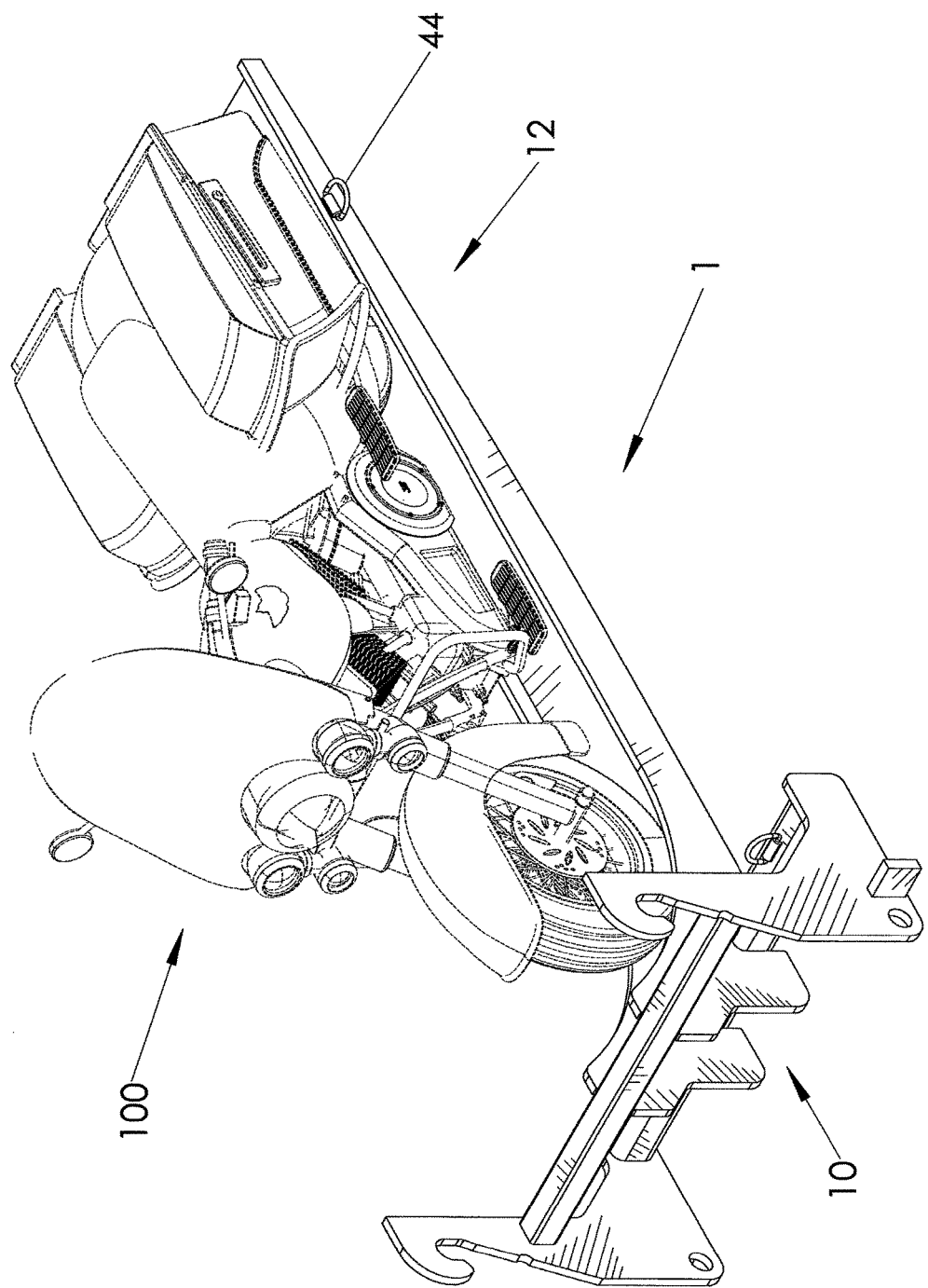
FIG. 3 is a front perspective view of a motorcycle fork with a motorcycle parked thereupon in accordance with the present invention.
Figure 4:
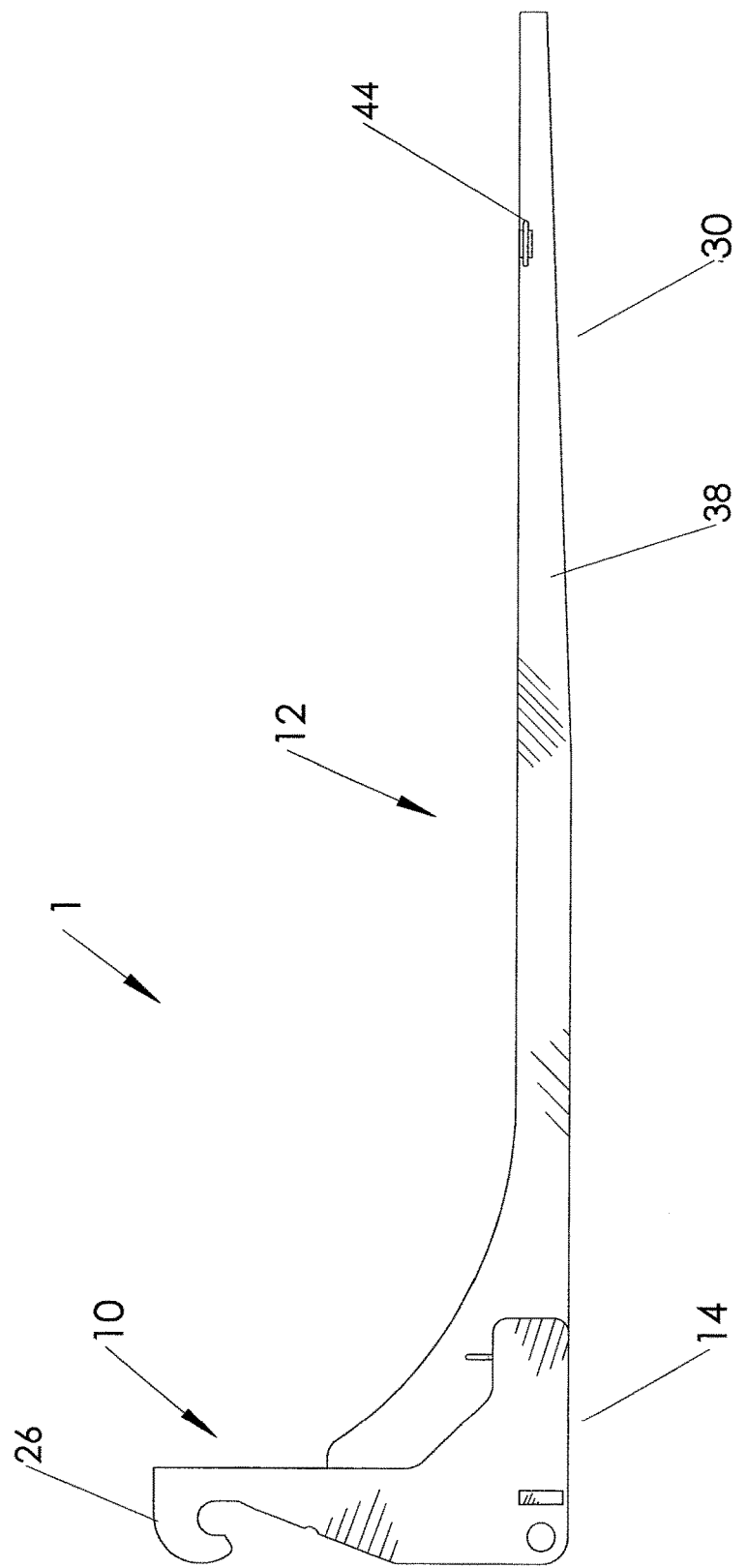
FIG. 4 is a side view of a motorcycle fork in accordance with the present invention.

With reference now to the drawings, and particularly to FIG. 1, there is shown a front perspective view of a motorcycle fork 1. With reference to FIGS. 2, 4 and 5, the motorcycle fork 1 preferably includes an attachment member 10 and a lift carriage 12. The attachment member 10 preferably includes a first hook plate 14, a second hook plate 16, a lower cross member 18 and an upper cross member 20. Each hook plate 14, 16 preferably includes a base portion 22, a lower extension 24 and a hook portion 26. The hook portion 26 extends upward from the base portion 22 and the lower extension 24 extends from a side of the base portion 22. A first end of the lower cross member 18 is attached to the lower extension 24 of the first hook plate 14 and a second end of the lower cross member 18 is attached to the lower extension 24 of the second hook plate 16. A first end of the upper cross member 20 is attached to a lower area 28 of the hook portion 26 of the first hook plate 14 and a second end of the upper cross member 20 is attached to a lower area 28 of the hook portion 26 of the second hook plate 16. The upper cross member 20 is located behind the lower cross member 18. With reference to FIG. 3, a motorcycle 100 is retained in the lift carriage 12.

The lift carriage 12 preferably includes a first side support 30, a floor plate 32 and a second side support 34. The side support 30, 34 preferably includes a lift base portion 36 and a tapered extension 38. An upper beam notch 40 is cut in a top of the lift base portion 36 and a lower beam slot 42 is cut in a bottom of the lift base portion 36. The upper beam notch 40 is preferably shaped to receive two sides of the upper cross member 20. The lower beam slot 42 is preferably shaped to receive three sides of the lower cross member 18. An inclined surface or curved inclined surface 45 is formed on a top of the lift base portion 36 of the first and second hook plates 14, 16. The tapered extension 38 extends from a side of the lift base portion 36. A height of the tapered extension 38 is greatest adjacent the lift base portion 36 and the least at an opposing end thereof. A first edge of the floor plate 32 is attached to a bottom of the first side support 30 and a second edge of the floor plate 30 is attached to a bottom of the second side support 34. It is preferably to attach strap loops 44 to the lower cross member 18 and to the first and second side supports 30, 34. The strap loops 44 enable the use of nylon ratchet straps (not shown) to retain a motorcycle. The first and second hook plates 14, 16 are preferably attached to the upper and lower cross members 20, 18 with welding, but other suitable attachment methods may also be used. The first and second side supports 30, 34 are preferably attached to the floor plate 32 with welding, but other suitable attachment methods may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A motorcycle fork for a lifting device comprising:
an attachment member includes a first hook plate, a second hook plate, a lower cross member and an upper cross member, a first end of said lower cross member is attached to a lower portion of said first hook plate, a second end of said lower cross member is attached to a lower portion of said second hook plate, a first end of said upper cross member is attached to an upper portion of said first hook plate, a second end of said upper cross member is attached to an upper portion of said second hook plate; and
a lift carriage includes a first side support, a floor plate and a second side support, a first edge of said floor plate is attached to said first side support, a second edge of said floor plate is attached to said second side support, a first end of said first and second side supports are secured to said lower and upper cross members, said lower cross member is offset from said upper cross member in a horizontal plane toward a second end of said first and second side supports.

2. The motorcycle fork for a lifting device of claim 1 wherein:
said first and second hook plates include a base portion, a lower extension and a hook portion, said hook portion extends upward from said base portion, said lower extension extends from a side of the base portion, wherein said lower cross member is attached to said lower extension, said upper cross member is attached to said hook portion.

3. The motorcycle fork for a lifting device of claim 1 wherein:
said first and second support plates include a lift base portion and a tapered extension, said tapered extension extends from a side of said lift base portion.

4. The motorcycle fork for a lifting device of claim 3 wherein:
an inclined surface is formed on a top of said lift base portion, a height of said tapered extension is greatest adjacent said lift base portion and least at an opposing end thereof.

5. The motorcycle fork for a lifting device of claim 1 wherein:
at least one strap loop is attached to at least one of said first and second side supports and said lower cross member.

6. The motorcycle fork for a lifting device of claim 1 wherein:
said first and second hook plates are attached to said upper and lower cross members with welding; and
said first and second side supports are attached to said floor plate with welding.

7. A motorcycle fork for a lifting device comprising:
an attachment member includes a first hook plate, a second hook plate, a lower cross member and an upper cross member, a first end of said lower cross member is attached to a lower portion of said first hook plate, a second end of said lower cross member is attached to a lower portion of said second hook plate, a first end of said upper cross member is attached to an upper portion of said first hook plate, a second end of said upper cross member is attached to an upper portion of said second hook plate; and
a lift carriage includes a first side support, a floor plate and a second side support, a first edge of said floor plate is attached to said first side support, a second edge of said floor plate is attached to said second side support, an upper notch is formed in said first and second side supports to receive said upper cross member, a lower slot is formed in said first and second side supports to receive said lower cross member, said first and second side supports are secured to said lower and upper cross members.

8. The motorcycle fork for a lifting device of claim 7 wherein:
said first and second hook plates include a base portion, a lower extension and a hook portion, said hook portion extends upward from said base portion, said lower extension extends from a side of the base portion, wherein said lower cross member is attached to said lower extension, said upper cross member is attached to said hook portion.

9. The motorcycle fork for a lifting device of claim 7 wherein:
said first and second support plates include a lift base portion and a tapered extension, said tapered extension extends from a side of said lift base portion.

10. The motorcycle fork for a lifting device of claim 9 wherein:
an inclined surface is formed on a top of said lift base portion, a height of said tapered extension is greatest adjacent said lift base portion and least at an opposing end thereof.

11. The motorcycle fork for a lifting device of claim 7 wherein:
at least one strap loop is attached to at least one of said first and second side supports and said lower cross member.

12. The motorcycle fork for a lifting device of claim 7 wherein:
said first and second hook plates are attached to said upper and lower cross members with welding; and
said first and second side supports are attached to said floor plate with welding.

13. A motorcycle fork for a lifting device comprising:
an attachment member includes a first hook plate, a second hook plate, a lower cross member and an upper cross member, a first end of said lower cross member is attached to a lower portion of said first hook plate, a second end of said lower cross member is attached to a lower portion of said second hook plate, a first end of said upper cross member is attached to an upper portion of said first hook plate, a second end of said upper cross member is attached to an upper portion of said second hook plate; and
a lift carriage includes a first side support, a floor plate and a second side support, a first edge of said floor plate is attached to said first side support, a second edge of said floor plate is attached to said second side support, a first end of said first and second side supports are secured to said lower and upper cross members, a height of said first and second side supports decreases from adjacent said upper cross member to an opposing end thereof, said lower cross member is offset from said upper cross member in a horizontal plane toward a second end of said first and second side supports.

14. The motorcycle fork for a lifting device of claim 13 wherein:

said first and second hook plates include a base portion, a lower extension and a hook portion, said hook portion extends upward from said base portion, said lower extension extends from a side of the base portion, wherein said lower cross member is attached to said lower extension, said upper cross member is attached to said hook portion.

15. The motorcycle fork for a lifting device of claim 13 wherein:

said first and second support plates include a lift base portion and a tapered extension, said tapered extension extends from a side of said lift base portion.

16. The motorcycle fork for a lifting device of claim 15 wherein:

an inclined surface is formed on a top of said lift base portion, a height of said tapered extension is greatest adjacent said lift base portion and least at an opposing end thereof.

17. The motorcycle fork for a lifting device of claim 13 wherein:

at least one strap loop is attached to at least one of said first and second side supports and said lower cross member.

18. The motorcycle fork for a lifting device of claim 13 wherein:

said first and second hook plates are attached to said upper and lower cross members with welding; and said first and second side supports are attached to said floor plate with welding.

* * * * *